Figures 1, 2:
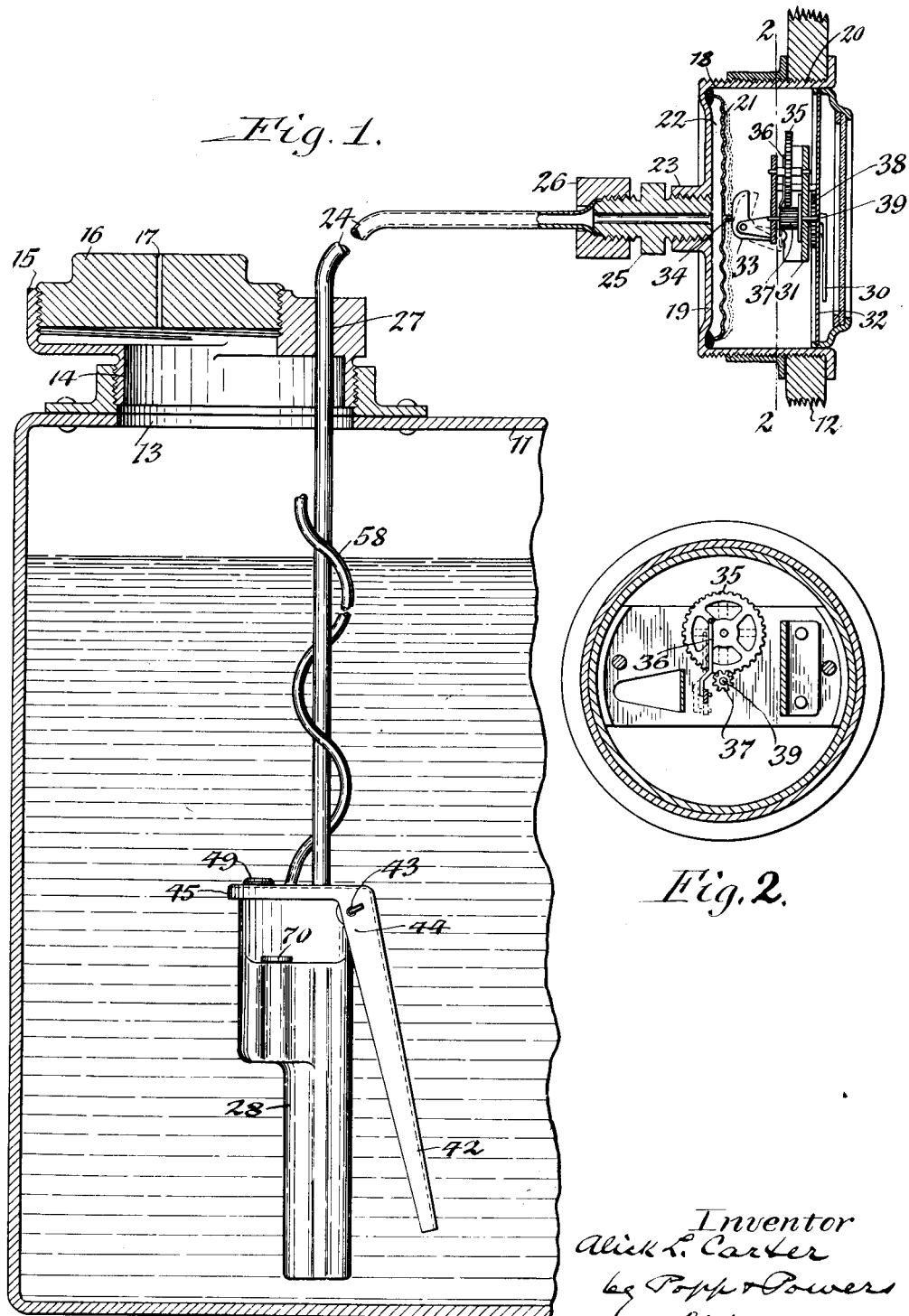

Dec. 13, 1927.

A. L. CARTER 1,652,761

LIQUID LEVEL GAUGE

Filed Oct. 3, 1923

2 Sheets-Sheet 1

Inventor
Alick L. Carter
by Popp & Powers
Attorneys.

Dec. 13, 1927.
A. L. CARTER
1,652,761
LIQUID LEVEL GAUGE
Filed Oct. 3, 1923
2 Sheets-Sheet 2
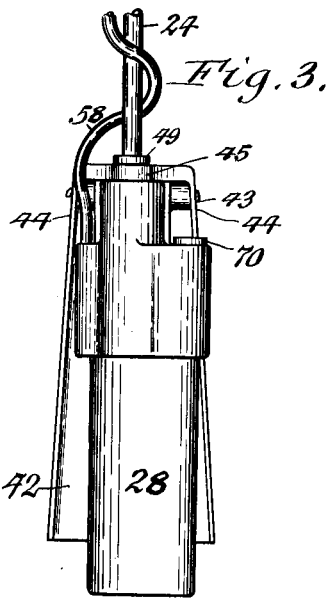
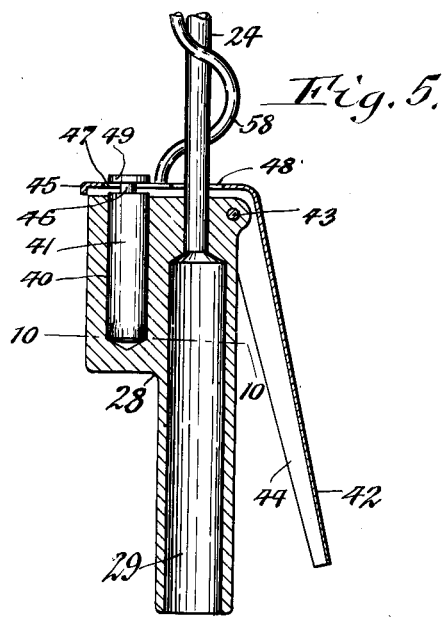
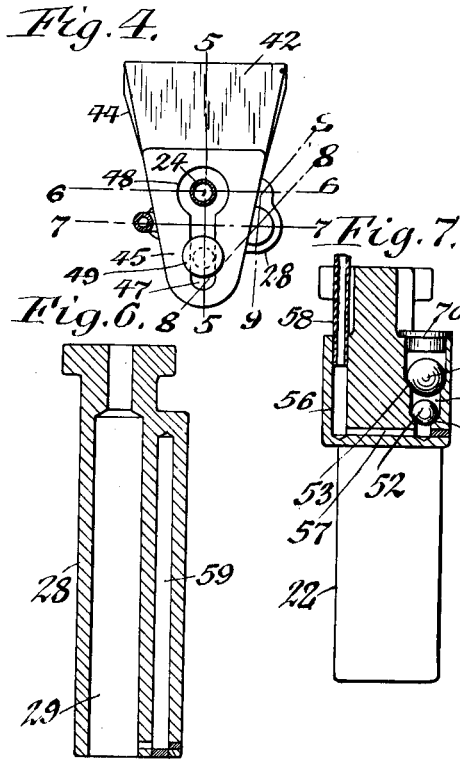
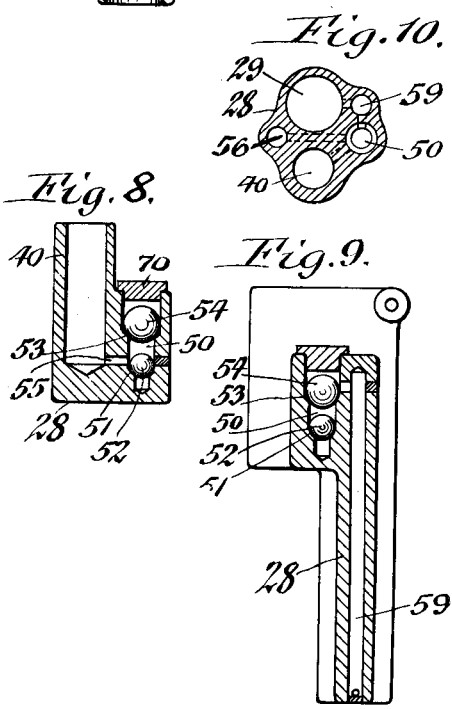
Inventor
Alick L. Carter
by Popp & Powers
Attorneys.

Patented Dec. 13, 1927.

UNITED STATES PATENT OFFICE.

ALICK L. CARTER, OF KENMORE, NEW YORK, ASSIGNOR, BY MESNE ASSIGNMENTS, TO THE GROLAN MANUFACTURING COMPANY, OF DAYTON, OHIO, A CORPORATION OF DELAWARE.

LIQUID-LEVEL GAUGE.

Application filed October 3, 1923. Serial No. 666,418.

This invention relates to a liquid level gauge for indicating the level of liquid in a tank which is subjected to an agitating action, such for instance as a tank on an automobile in which gasoline or oil is stored.

A liquid level gauge of this same general character is shown and described in an application for patent filed May 19, 1923, Serial No. 640,185 and the present invention is an improvement thereon.

The object of this invention is to produce a liquid level gauge of this character in which the details of construction are improved and simplified so as to reduce the cost of manufacture, facilitate its installation and avoid the possibility of the working parts getting out of order.

In the accompanying drawings: Figure 1 is a vertical section showing my improved liquid level gauge installed in connection with the gasoline tank and an indicating device of an automobile. Figure 2 is a vertical section taken on the correspondingly numbered line in Figure 1, and showing parts of the indicating mechanism. Figure 3 is a rear elevation of the actuating part of the liquid level gauge embodying my invention which is designed to be placed in the lower part of the gasoline tank or similar installation. Figure 4 is a top plan view of the same showing the air inlet and outlet pipes in section. Figures 5, 6, 7, 8 and 9 are vertical sections taken on the correspondingly numbered lines in Figure 4. Figure 10 is a horizontal section taken on line 10—10 of Figure 5.

Similar characters of reference indicate like parts throughout the several figures.

Although this invention may be installed in various ways the same in the present instance is shown in connection with a storage tank 11 mounted on a suitable part of the automobile frame and adapted to contain a supply of gasoline, and an indicating device arranged on the dash board 12 of the automobile and adapted to be actuated by the actuating mechanism which embodies my invention and which is mounted within the gasoline tank so as to be responsive to the surging of the gasoline which is stored in the tank. This gasoline tank is preferably provided in its upper side with a filling opening 13 through which the gasoline is introduced into the same. Within this opening is secured a hollow head 14, the upper part 15 of which is offset relatively to the lower part and provided with an internal screw thread which receives an externally screw threaded plug or cap 16 and thus forms a closure for the inlet or filling opening of the tank. The plug 16 is provided with a vent 17 which leads to the outer atmosphere and thus enables air to freely enter and leave the top of the tank as the level of the gasoline therein varies. Various forms of indicating devices may be employed which are responsive to air pressure for use in connection with my invention, that shown in the drawings being typical of one form which is satisfactory and as shown in the drawings the same is constructed as follows:

18 represents the cylindrical body of the indicating device which is provided at its rear end with a head 19 while its front part is secured in an opening 20 in the dash or instrument board. Within the casing and adjacent to its rear wall is a flexible diaphragm 21 which is spaced apart from this head and connected at its marginal edge thereto in any suitable manner, as by solder, so as to form an expansion chamber 22 therebetween. This diaphragm may be constructed of any suitable material, preferably flexible thin sheet metal which is provided with a plurality of concentric corrugations so that the same is strong and durable but sufficiently flexible and tending constantly to operate as a spring which acts to move the diaphragm rearwardly or toward the rear head of the casing. On its rear side the rear head of the casing is provided centrally with a rearwardly projecting tubular boss 23 with which is connected a transmitting tube 24 whereby air pressure is transmitted from the actuating mechanism within the tank containing my invention to the expansion chamber of the indicating mechanism. The boss 23 and transmitting conduit or tube are preferably detachably connected, the means shown in the drawings for this purpose consisting of a nipple 25, one end of which screws into the boss 23 while the other end of the same is connected by a clamping sleeve or collar 26 with the upper end of the transmitting conduit, as shown in Figure 1.

As the pressure in the transmitting tube 24 increases the diaphragm 21 is moved forwardly and as this pressure decreases the resilience of the diaphragm causes the same to spring backwardly. This motion of the diaphragm is utilized to actuate a rotary pointer or hand 30 which is pivotally mounted on a frame 31 within the indicator casing and adapted to traverse graduations of any suitable character which may be arranged on a dial 32. In the preferred construction a forward motion of the diaphragm is transmitted to this pointer or indicator hand by means of an elbow lever 33 mounted on the frame 31 and having an upright arm which engages with a thrust or bearing pin 34 on the front side of the diaphragm, a gear wheel 35 journaled on the frame 31 and having a crank pin which is connected by means of a connecting rod 36 with the horizontal arm of the elbow lever 33, and a gear pinion 37 connected with the axle 39 of the pointer or hand 30 and meshing with the gear wheel 35. The return movement of the hand and the gearing connected therewith upon a reduction of the pressure behind the diaphragm is preferably effected by means of a spring 38, one end of which is connected with the axle or spindle 39 of the hand 30 while its other end is connected with an adjacent part of the frame 31. This indicating mechanism may be constructed in its entirety like that shown in the patent application above referred to and only so much of it is here shown and described for the purpose of setting forth a form of indicating mechanism suitable for use in connection with my improvements.

The improved pressure fluid supplying mechanism which is arranged within the tank and which is responsive to surging of the liquid therein for supplying operating fluid to the indicating mechanism in accordance with my invention is constructed as follows:

On one side of the opening in the hollow head 14 which receives the plug 16 the same is provided with a vertical opening 27 in which is arranged the receiving end of the transmitting tube or conduit 24, which receiving end is preferably arranged vertically and extends downwardly toward the bottom of the tank. Mounted on the lower end of the receiving portion of this transmitting tube is the casing or body 28 of the actuating mechanism which operates to maintain an air pressure in the transmitting conduit 24 by motion which is derived from the surging action of the gasoline. By thus mounting this body on the transmitting tube 24 the latter not only serves as a hanger for supporting the body 28 but also as a means for transmitting fluid pressure and thereby materially simplifies the construction of the apparatus. Within the body 28 is formed a comparatively large equalizing or compensating chamber 29 which is arranged vertically and communicates at its upper end with the lower end of the transmitting tube 24 while its lower end opens downwardly and is arranged close to the bottom of the gasoline tank so that this end of the equalizing chamber is constantly submerged in the body of gasoline within the tank excepting when the latter is practically empty.

Arranged in the upper part of the actuator body 28 is the upright cylinder 40 of an air pump which cylinder is closed at its lower end and opens at its upper end through the top of said body. Reciprocating vertically within this pump cylinder is a pump plunger or piston 41 which latter is actuated by reciprocating movement derived from the surging of the gasoline which is stored in the tank when the automobile starts or stops or varies its speed while in motion. For the purpose of thus actuating the piston 41 a vane, paddle, wing, or blade 42 is provided which latter is arranged in an upright position in front of the actuator body 28 and pivoted at its upper end to the corresponding end of the actuator body 28 in front of the transmitting tube 24 by means of a pintle 43 passing horizontally through the upper part of the actuator body and perforated lugs or flanges 44 arranged on the corresponding end of the paddle. Extending rearwardly from the upper end of the paddle is an operating arm 45 which is operatively connected with the upper end of the pump plunger 41. This connection is preferably effected by providing the upper end of the pump plunger with an annular groove so as to form a reduced neck 46 thereon and engaging this groove with the narrow rear part 47 of a keyhole slot formed in the actuating arm 45, the front or large part 48 of this slot being sufficiently large in diameter so as to permit the passage of the head 49 of the piston or plunger therethrough while the narrow rear part of this slot has a width less than the diameter of the head 49 and body 41 of the pump plunger. It is thus possible to easily assemble and dismember the actuating arm and pump plunger by passing the latter through the enlarged part 48 of the keyhole slot and passing the reduced neck 46 of the plunger into and out of the narrow part 47 of this slot. In the preferred construction the vane or paddle and the operating arm are constructed from a single sheet of metal by means of suitable dies or forming tools, this construction of the paddle and operating arm being shown in Figures 1, 3, 4 and 5 of the drawings.

In order to produce a compact structure and also to balance the several parts of the actuating portion of this liquid level gauge the transmitting tube 24 is so arranged that the same passes through the enlarged part 48 of the keyhole slot in the operating arm, as best shown in Figures 4 and 5.

50 represents a valve chamber formed in the rear part of the actuator or pump body 28 and provided in its lower part with an inwardly facing check valve seat 51 which is adapted to be engaged by an inwardly opening check valve 52 preferably of ball form, while its upper part is provided with an outwardly facing valve seat 53 which is adapted to be engaged by an outwardly opening check valve 54 preferably of ball form, as shown in Figures 7, 8 and 9. Between these two valve seats this valve chamber is connected by a passage 55 with the lower end of the pump cylinder. At its upper end this valve chamber is closed by a plug 70 which is preferably secured in this end of the valve chamber by a friction fit although the same may be otherwise secured therein if desired.

In a side of the actuator body 28 is the vertical passage 56 communicating at its lower end through the horizontal passage 57 with the lower end of the valve chamber 50. From the upper end of the passage 56 leads the flexible tube 58 with its upper end opening into the upper part of the tank above the normal level of the liquid contained in the tank. Air entering the upper end of the tube from the tank passes through the tube and the passages 56 and 57 into the lower end of the valve chamber 50.

The intermediate portion of the air supply tube is preferably constructed in the form of a coil, as shown in Figures 1, 3 and 5 which permits the upper end of this air pipe to be raised and lowered to suit the height of the tank in which this device is installed. In order to retain this air supply pipe in its proper position relatively to the other parts of the mechanism and prevent the same from being deflected into an inoperative position, the coils of this air pipe are wound around the transmitting tube 24, as shown in Figures 1, 3 and 5, whereby separate means for thus maintaining the air supply pipe in its proper position are rendered unnecessary.

Arranged vertically along one side of the equalizing chamber 29 is an air delivery passage 59 which opens at its upper end into the valve chamber above the upper outlet check valve while its lower end opens into the equalizing chamber immediately above or adjacent to the lower end thereof, as shown in Figures 6 and 9.

As the automobile is set in motion or comes to a rest or varies its speed while in motion the vane 42 is oscillated about the horizontal transverse axis formed by the pintle 43 which motion of the vane is accentuated by the surging of the gasoline back and forth in the tank. This rocking or oscillating motion thus imparted to the vane is in turn caused to reciprocate the pump plunger or piston by reason of the alternate raising and lowering of the operating arm 45. During the upward motion of the pump plunger air is drawn from the upper part of the gasoline tank downwardly through the air supply tube 58, passages 56 and 57, past the valve seat 51 into the valve chamber 50 and through the passage 55 into the pump cylinder, during which time the check valve 54 is held shut against its seat 53 so as to prevent backward movement of the air from the passage 59 into the valve chamber. During the descent of the piston or plunger the air within the cylinder 40 is expelled therefrom and caused to pass outwardly through the passage 55, valve chamber 50, past the upper check valve 54, downwardly through the delivery passage 59 and into the lower end of the equalizing chamber, it being understood that the inlet check valve 52 at this time engages its seat 51 so as to prevent the backward movement of air through the supply passages 56 and 57 and tube 58.

As the compressed air passes from the delivery passage 59 into the lower end of the equalizing chamber 29 this air will bubble up through any liquid that may be present therein and accumulate above such liquid and finally cause all of this liquid to be forced downwardly in this chamber and to be expelled from the lower end thereof. When the level of the liquid in the tank is comparatively high the hydrostatic resistance offered by the liquid in the storage tank is comparatively great and requires greater air pressure to keep the liquid out of the equalizing chamber so that a comparatively high reading of air pressure is indicated by the pointer 30 on the dial 32. But when the level of the liquid in the tank is comparatively low a reduced hydrostatic resistance is offered to the air in the equalizing chamber 29 so that the liquid can be kept out of the equalizing chamber with less pressure and thus reduces the pressure within the latter and the conduits communicating therewith so that the diaphragm 21 will be permitted to retract more or less toward its rearward position and thus permit the pointer 30 to move backwardly on the dial 32 and indicate a lower reading thereon according to the amount of gasoline in the tank. The amount of air supplied by the pump is always in excess of that required to force the liquid downwardly out of the equalizing chamber and keep it out while the automobile is in operation and imparting a surging to the gasoline in the tank to oscillate the vane which actuates the pump plunger. This excess air passes around the lower edge of the equalizing chamber and bubbles up through the gasoline in the tank and gathers in the air space in the tank above the gasoline.

When the actuating mechanism is connected with the indicating instrument and placed in the tank containing the liquid, a portion of the liquid rises in the equalizing chamber and transmitting tube until the absolute pressure in the complete instrument is equal to atmospheric pressure plus the weight of the outer column of liquid in the tank. We then have a correct reading of the instrument due to the fact that the pressures are balanced. This reading is correct as long as there is no barometric or temperature change. If the temperature falls, the air in the instrument will contract approximately twenty per cent of its volumn in 100° F., thereby throwing the instrument out of balance as part of this loss is taken up by the liquid rising in the compensating chamber and the balance by the diaphragm contracting, thus showing a lower reading which only stops when a correct hydrostatic balance is once more effected. The reverse applies to the rise of temperature except that the probabilities are that a certain portion of the trapped air in the instrument will be lost out of the compensating chamber.

Assuming that the equalizing or compensating device is lowered into the liquid the level of which is to be gauged without operating the compensating pump an internal column of liquid would rise in the compensating chamber which would be of less height than the column of liquid externally of this chamber. In that case the pressure on the column of air within the equalizing or compensating chamber would in the first instance be equal to the weight of the column of liquid outside of the compensating chamber plus atmospheric pressure, which pressure would vary according to the height of the external column of liquid and produce a correct reading accordingly on the indicating device. If now the air within the compensating chamber should become heated and expand during warm weather the column of liquid within the compensating chamber is depressed and the column of liquid externally of the compensating chamber would be raised, thus producing an increase of air pressure on the indicating device which is incorrect and does not accurately denote the amount of liquid in the tank. On the other hand if the weather becomes colder and the air in the compensating chamber contracts then the internal column of liquid rises within the compensating chamber to an abnormal extent and the external column of liquid lowers accordingly, thereby causing the indicating device to produce a reading which is below the correct amount and shows less than the actual amount of liquid in the tank.

When, however, air is constantly pumped into the compensating chamber so that the column of liquid which would ordinarily be formed therein is expelled therefrom and only air is present therein at all times, then any loss of the air confined in the compensating chamber during a rise of temperature or a fall of the barometer, will be immediately adjusted by fresh air being injected into the compensating chamber by the pump to maintain constantly an air column between the tank and the indicator. If on the other hand the temperature drops or the barometer rises, which would tend to cause the liquid to rise in the form of a column within the compensating chamber such formation of an internal column of liquid is prevented by the constant inflow of air into the compensating chamber, and thus the air column so formed prevents the indicator from reading lower than the correct amount.

It will thus be apparent that an inaccurate reading of the level of the liquid to be guaged would be liable to occur on the indicating device in the absence of the auxiliary pressure mechanism hereinbefore described which supplements the hydrostatic pressure of the gasoline. It is therefore possible to compensate for any variations in the pressure which otherwise would be caused within the transmitting conduit due to barometric and temperature changes and also by reason of a portion of the air in the transmitting conduit being dissolved or absorbed by the gasoline or other liquid which is being gauged, as well as by the condensation of any diffused vapors or any of the liquids within this conduit. The addition thereto of compressed air by mechanism which is responsive to surging of the gasoline within the tank while the automobile is moving irregularly as well as stopping and starting at intervals compensates for variations in barometric and temperature changes, as well as dissolution of a portion of the entrapped air in the transmitting conduit causes an automatic regulation of the reading on the indicating mechanism and enables the correct amount of gasoline in the tank to be determined.

The present embodiment of my invention as compared with that shown in the former application referred to is much simpler in construction, the same can be manufactured and assembled more easily and the same is less likely to get out of order while being installed or while in use.

I claim as my invention:

1. The combination of a tank for storing liquid intended to be subjected to movement and a pressure responsive liquid level gauge, with a casing fixedly mounted in the tank and provided with an equalizing chamber open at its lower end to the interior of the lowest part of the tank, a tube leading from the upper end of the equalizing chamber to the gauge, said tube and chamber forming a closed conduit between the tank and gauge, said casing including a pump cylinder having valve-controlled inlet and outlet ports with the inlet port communicating with the exterior air and the outlet port communicating with the closed conduit, a pipe providing the communication between the inlet port and the exterior air, a plunger coacting with the pump cylinder to force air into the closed conduit to maintain therein an air column between the tank and the gauge to transmit the liquid pressure in the tank to the gauge, and a vane pivoted to the casing and having an arm connected with the plunger, the wing of the vane being positioned in the tank to receive the impact of the surges imparted to the contained liquid by movement of the tank.

2. The combination of a tank for storing liquid intended to be subjected to movement and a pressure responsive liquid level gauge, with a casing fixedly mounted in the lower part of the tank to be submerged therein when the tank is charged with liquid, said casing being provided with an equalizing chamber open at its lower end to the interior of the lowest part of the tank, a tube leading from the upper end of the equalizing chamber to the gauge, said tube and chamber forming a closed conduit between the tank and gauge, said casing including a pump cylinder having a valve-controlled inlet port and passage leading from the upper end of the casing and a valve-controlled outlet port and passage leading into the lower end of the equalizing chamber, a flexible tube communicating with the upper end of the inlet passage and extending upwardly through the liquid to open to the air above the highest level of the liquid to supply air to the inlet passage and port, a plunger coacting with the pump cylinder to effect the movement of air into the closed conduit to maintain an air column therein between the tank and gauge to transmit the liquid pressure in the tank to the gauge, said plunger having a head and a neck connecting the head to the body part of the plunger, and a vane pivoted to the casing and having a slotted arm engaging the neck of the plunger, the wing of the vane being immersed in the liquid of the tank to receive the impact of the surges imparted to the contained liquid by movement of the tank.

In testimony whereof I affix my signature.

ALICK L. CARTER.